United States Patent
Gilbert

(10) Patent No.: US 7,269,431 B1
(45) Date of Patent: Sep. 11, 2007

(54) SYSTEM FOR FORWARDING SMS MESSAGES TO OTHER DEVICES

(75) Inventor: Quenton Lanier Gilbert, Atlanta, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 469 days.

(21) Appl. No.: 10/759,852

(22) Filed: Jan. 16, 2004

(51) Int. Cl.
*H04Q 7/20* (2006.01)
*H04Q 7/38* (2006.01)

(52) U.S. Cl. .............. 455/466; 455/414.1; 455/414.4; 455/445; 455/412.1; 455/417; 455/422.1; 455/403; 709/206; 709/202; 709/203; 709/219; 709/228; 709/229; 709/237; 379/100.01; 379/211.01; 379/211.02; 379/212.01

(58) Field of Classification Search ................ 455/466, 455/414.1, 414.4, 417, 422.1, 403, 412.1, 455/412.2, 426.1, 426.2, 445, 550.1, 500, 455/517, 556.1, 556.2, 567, 100.01, 100.13, 455/142.04, 212.01, 211.01, 211.02, 142.07; 709/206, 202, 203, 219, 228, 229, 237
See application file for complete search history.

(56) References Cited

U.S. PATENT DOCUMENTS

| | | | |
|---|---|---|---|
| 5,909,651 | A | 6/1999 | Chander et al. |
| 6,006,085 | A | 12/1999 | Balachandran |
| 6,185,605 | B1 | 2/2001 | Kowaguchi |
| 6,240,296 | B1 | 5/2001 | Yu et al. |
| 6,289,223 | B1 | 9/2001 | Mukherjee et al. |
| 6,384,739 | B1 | 5/2002 | Roberts, Jr. |
| 6,397,054 | B1 | 5/2002 | Hoirup et al. |
| 6,424,841 | B1 | 7/2002 | Gustafsson |
| 6,801,931 | B1 | 10/2004 | Ramesh et al. |
| 6,813,489 | B1 | 11/2004 | Wu et al. |
| 2001/0036822 | A1 | 11/2001 | Mead et al. |
| 2002/0068554 | A1 | 6/2002 | Dusse |

(Continued)

FOREIGN PATENT DOCUMENTS

WO WO 95/26113 9/1995

(Continued)

OTHER PUBLICATIONS

"Short Message Peer to Peer Protocol Specification v3.4", Issue 1.2, SMPP Developers Forum, Oct. 12, 1999, 169 pages.

(Continued)

*Primary Examiner*—Keith Ferguson
(74) *Attorney, Agent, or Firm*—Zagorin O'Brien Graham LLP

(57) ABSTRACT

Improved techniques for communicating short messages forward an electronic message to an alternate communications device if the system is unable to deliver the short message to a destination communications device. The electronic message is formatted to be compliant with the alternate communications system. Alternatively, the short message may be formatted in compliance with a destination communications device that is not short message compliant and sent to the destination communications device. In some embodiments of the present invention, a method for communicating short messages includes forwarding an electronic message to a first communications device, the forwarding in response to at least an indicator of unsuccessful delivery of a short message to a destination communications device. The first communications device may be incompatible with short message service. The forwarding may be enabled from the destination communications device, the first communications device, or a web browser.

24 Claims, 2 Drawing Sheets

U.S. PATENT DOCUMENTS

| | | | |
|---|---|---|---|
| 2002/0090963 A1* | 7/2002 | Avalos et al. | 455/466 |
| 2002/0164983 A1 | 11/2002 | Raviv et al. | |
| 2002/0187794 A1* | 12/2002 | Fostick et al. | 455/466 |
| 2003/0016639 A1* | 1/2003 | Kransmo et al. | 370/335 |
| 2003/0054810 A1 | 3/2003 | Chen et al. | |
| 2003/0119532 A1* | 6/2003 | Hatch | 455/466 |
| 2003/0172121 A1* | 9/2003 | Evans et al. | 709/206 |
| 2004/0205248 A1 | 10/2004 | Little et al. | |
| 2005/0164693 A1 | 7/2005 | Yach et al. | |
| 2005/0164721 A1 | 7/2005 | Yeh et al. | |

FOREIGN PATENT DOCUMENTS

| | | |
|---|---|---|
| WO | WO95/26113 | 9/1995 |
| WO | WO 00/19697 | 4/2000 |
| WO | WO 01/78422 A1 | 10/2001 |

OTHER PUBLICATIONS

"Cellular Communications", Web ProForum Tutorials, http://www.iec.org, The International Engineering Consortium, 23 pages.

"Wireless Short Message Service (SMS)", Web ProForum Tutorials, http://www.iec.org, The International Engineering Consortium, 18 pages.

"Wireless Application Protocol (WAP)", Web ProForum Tutorials, http://www.iec.org, The International Engineering Consortium, 15 pages.

"Short Message Service", Mar. 12, 2002, http://www.webopedia.com/TERMS/short_message_service.html, 2 pages.

"Wireless Short Message Service (SMS)", International Engineering Consortium, On-Line Education, http://www.iec.org/online/tutorials/wire_sms/topic03.html, 3 pages.

SMPP Developers Forum, "Short Message Peer to Peer Protocol Specification v.3.4," Document Version: Oct. 12, 1999, Issue 1.2, pp. 1-169.

The International Engineering Consortium, "Number Portability: Ensuring Convenience and Fostering Competition in Telecommunications," (http://www.iec.org), pp. 1-26, no date available.

The International Engineering Consortium, "Wireless Short Message Service (SMS)," (http://www.iec.org), pp. 1-18, no date available.

Puneet Gupta "Short Message Service: What, How and Where?," Wireless Developer Network, 2000-2003 (http://www.wirelessdevnet.com/channels/sms/features/sms.html), pp. 1-7, no date available.

Cingular Wireless, "E-mail Solutions: Your desktop in the palm of your hand," 2003, (http://www.cingular.com/business/email_solutions), 1 page, no date available.

Cingular Wireless, "Xpress Mail with GoodLink," 2003, (http://www.cingular.com/business/express_mail_goodlink), pp. 1-5, no date available.

Cingular Wireless, 2003, "Xpress Mail with GoodLink," 3 pages, no date available.

Cingular Wireless, "Xpress Mail with BlackBerry™," 2003 (http://www.cingular.com/business/xpress_mail_blackberry), pp. 1-2, no date available.

Cingular Wireless, "Xpress Mail with BlackBerry™ and Interactive Messaging PLUS," 2003, 2 pages.

Cingular Wireless, "Network Edition," (http://www.cingular.com/business/express_mail_ne), 2003, pp. 1-2, no date available.

Cingular Wireless, "Xpress Mail Network Edition," 2001, 2 pages, no date available.

internet.com (Webopedia), "TCP/IP, Abbreviation for Transmission Control Protocol/Internet Protocol," 2003, (http://www.webopedia.com/TERM/TCI_IP.html), pp. 1-3, no date available.

Verizon Wireless, "Small Office/Home Office Office Email & Organizer," 2003, (http://www.verizonwireless.com/b2c/businessSolutions/smallOfficeHomeOffice/emailOrganizer.jsp), pp. 1-2, no date available.

Verizon Wireless, "Product Comparison Chart," 2003, (http://www.verizonwireless.com/multimedia/officeEmailDemo/product.htm), pp. 1-2, no date available.

Verizon Wireless, "Wireless Sync Program," 8 pages, no date available.

"Short Message Peer to Peer Protocol Specification v3.4", Issue 1.2, SMPP Developers Fourm, Oct. 12, 1999, 169 pages.

"Cellular Communications", Web ProForum Tutorials, http://www.iec.org, The International Engineering Consortium, 23 pages, no date available.

"Wireless Short Message Service (SMS)", Web ProForum Tutorials, http://www.iec.org, The International Engineering Consortium, 18 pages, no date available.

"Wireless Application Protocol (WAP)", Web ProForum Tutorials, http://www.iec.org, The International Engineering Consortium, 15 pages, no date available.

"Short Message Service", Mar. 12, 2002, http://www.webopedia.com/TERMS/S/short_message_service.html, 2 pages.

"Wireless Short Message Service (SMS)", International Engineering Consortium, On-Line Education, http://www.iec.org/online/tutorials/wire_sms/topic03.html, 3 pages, no date available.

* cited by examiner

SYSTEM FOR FORWARDING SMS MESSAGES TO OTHER DEVICES

BACKGROUND OF THE INVENTION

1. Field of the Invention

The present invention relates to telecommunications, in general, and more particularly to forwarding electronic mail messages.

2. Description of the Related Art

Short message service (SMS) is a wireless service that enables the transmission of alphanumeric messages between mobile subscribers and between mobile subscribers and systems external to the mobile network (e.g., electronic mail, paging, and voice processing systems). The Short Message Peer to Peer (SMPP) protocol standardizes an SMS communication interface for the communication of messages between a message center and an SMS application system. For a detailed description of the SMPP protocol, see SMPP Developers Forum, Short Message Peer to Peer Protocol Specification v3.4 (Oct. 12, 1999).

In general, a user of SMS messaging may have multiple communications devices (e.g., cellular telephones, personal digital assistants (PDAs)). The user may forward to an alternate communications device SMS messages addressed to a cellular telephone. However, not all of these devices may be SMS compatible and a user may possess only one SMS compatible communications device (e.g., a cellular telephone). Simply forwarding all SMS messages to a second communications device is futile if the second communications device is not SMS compatible.

When an SMS subscriber's SMS-compliant communications device is disabled or otherwise unable to receive short messages, the message remains in an SMS queue for the communications device until either transmission is successful or the message expires. Maintaining the message in the SMS queue and resending the message consumes network resources and may delay or prevent successful transmission and receipt of the message.

In addition, to initiate a forwarding request, a user typically enables forwarding from a first device, i.e., the communications device from which messages are forwarded. However if the first device is unavailable to the user or disabled, the user may not be able to initiate a forwarding request. Thus, improved techniques for handling SMS messages are desired.

SUMMARY OF THE INVENTION

Improved techniques for communicating short messages forward an electronic message to an alternate communications device if the system is unable to deliver the short message to a destination communications device. The electronic message may be formatted to be compliant with the alternate communications system. Alternatively, the short message may be formatted in compliance with a destination communications device that is not SMS-compliant and sent to the destination communications device. In some embodiments of the present invention, a method for communicating short messages includes forwarding an electronic message to a first communications device, the forwarding in response to at least an indicator of unsuccessful delivery of a short message to a destination communications device. The first communications device may be incompatible with short message service. The forwarding may be enabled from the destination communications device, the first communications device, or a web browser. The method may remove the short message from a short message queue.

In some embodiments of the present invention, a system for communicating short messages includes a short message management facility that communicates an electronic message to a first communications device in response to an indicator of an unsuccessful delivery of the short message to a destination communications device. The system may include a destination communications device for receiving at least one short message from the short message management facility. The system may include a first communications device for receiving at least one electronic message from the short message management facility. The system may include a first store that stores at least one entry corresponding to the destination communications device.

In some embodiments of the present invention, a computer program product is encoded in one or more computer readable media selected from the set of disk, tape, or other magnetic, optical, or electronic storage medium. The computer program product includes instructions for forwarding an electronic message to a first communications device. The forwarding is in response to at least an indicator of unsuccessful delivery of the short message to a destination communications device.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF EXEMPLARY EMBODIMENTS

Figure 1:
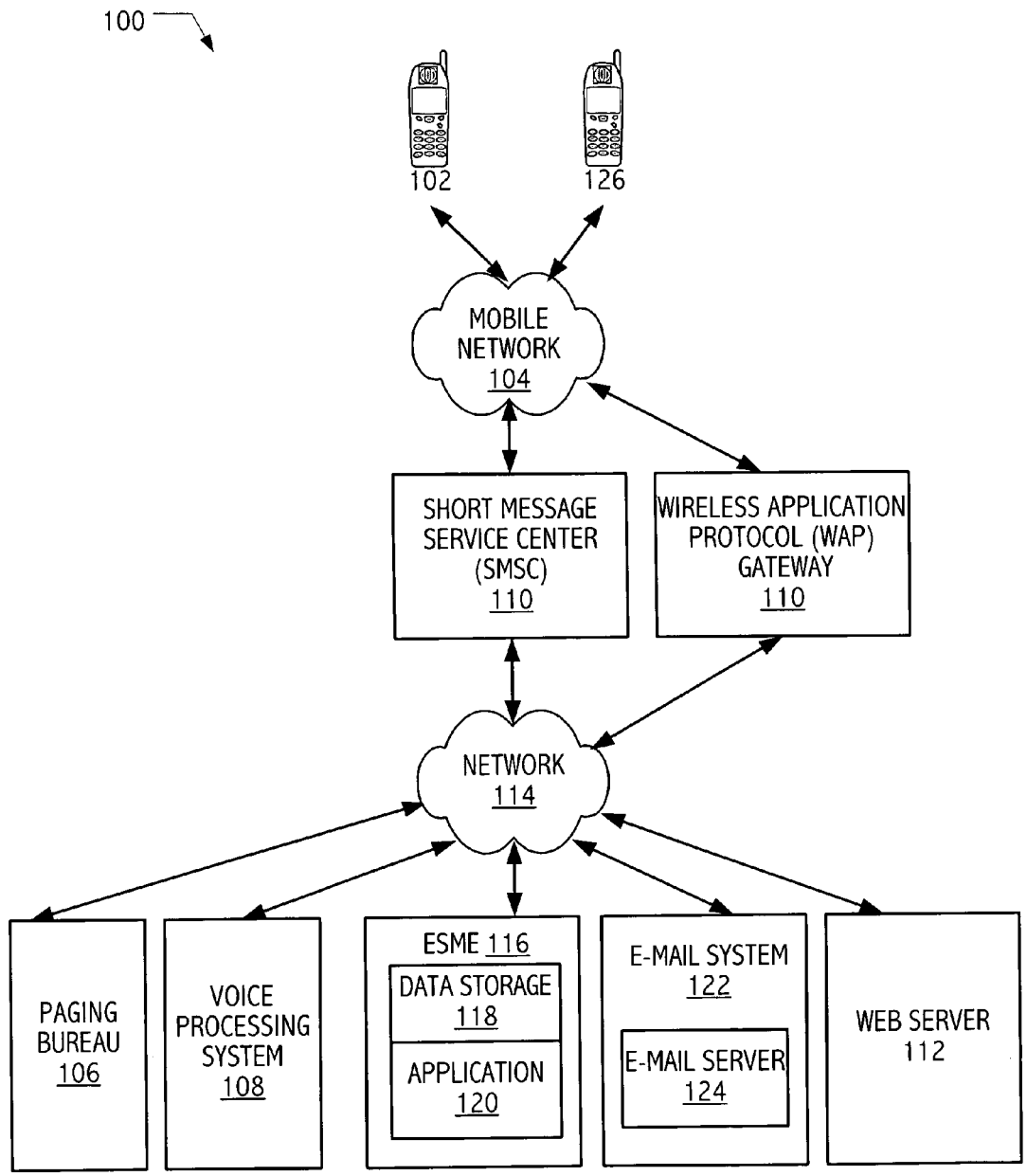
FIG. 1 illustrates an exemplary communications network in accordance with one or more embodiments of the present invention.

FIG. 1 illustrates system 100, which includes a digital cellular network that may be implemented with any digital cellular network technology including Global System for Mobile communications (GSM) and IS-95 (CDMA) technologies. An external short message entity (ESME) (e.g., generic ESME 116, paging bureau 106, or voice processing system 108) transmits a message to network 114. An ESME is a non-mobile entity that submits messages to, or receives messages from a message center. A message center is any short message peer to peer (SMPP) server entity to which an SMPP client ESME can be coupled. Network 114 routes the message from ESME 116 to SMSC 110, which then transmits the message to a destination communications device (e.g., communications device 102 or alternate communications device 126) in mobile network 104. Note that although paging bureau 106 and voice processing system 108 may each operate as an ESME, each may have an interface to an ESME, which will then send and receive messages to and from the SMSC instead.

In general, short message service center 110 receives messages from a short message entity (SME) and attempts to transmit the messages to appropriate destination addresses within mobile network 104 (e.g., mobile communications device 102). To properly transmit messages, SMSC 110 retrieves routing information for determining the serving mobile switching center (MSC) for the mobile station at the time of attempted delivery by interrogating a home location register (HLR). Short message service center 110 then sends the short message to the MSC within mobile network 104. The MSC retrieves subscriber information from a visitor location register (VLR), transfers the message to a mobile station (MS), and sends a delivery report to SMSC 110.

ESME 116 transmits short messages over network 114 to a short message entity (SME) with a destination address in mobile network 114 using a submit_sm message, which may also be a data_sm message, or any other suitable message format for delivering an SMS message. The short message is received by a message center (e.g., SMSC 110) which then transmits the message to the SME (e.g., destination communications device 102). The message center receives the message, but note that in the exemplary embodiment illustrated in FIG. 1, the message center may be any one of multiple SMSCs. A message center may support only particular portions of mobile network 104 and thus, network 114 may route a message to a particular message center on that basis. Network 114 may be similar to a transmission control protocol/internet protocol (TCP/IP) network or X.25 network and connects application 120, residing on ESME 116, to the message center. The message center may be a Short Message Service Center (SMSC) or a GSM Unstructured Supplementary Services Data (USSD) server, or other type of intermediate server that includes a short messaging application system and gateway.

In a typical message sequence, an ESME (e.g., e-mail system 122) functions as a transmitter of messages, e.g., a user emails a text message to a mobile subscriber. The ESME transmits the message through a network to an SMSC corresponding to the destination mobile subscriber. The SMSC then transmits the message through the mobile network to the destination device. Similarly, a mobile device may transmit a message destined for a second mobile device. The originating mobile device transmits the message to an SMSC corresponding to the originating mobile device. This SMSC forwards the message to an SMSC that corresponds to the destination mobile device. The SMSC that corresponds to the destination mobile device transmits the message to the destination mobile device. If the originating and terminating devices are served by the same SMSC, then the forwarding is not necessary and the originating SMSC transmits the message to the destination mobile device.

Figure 2:
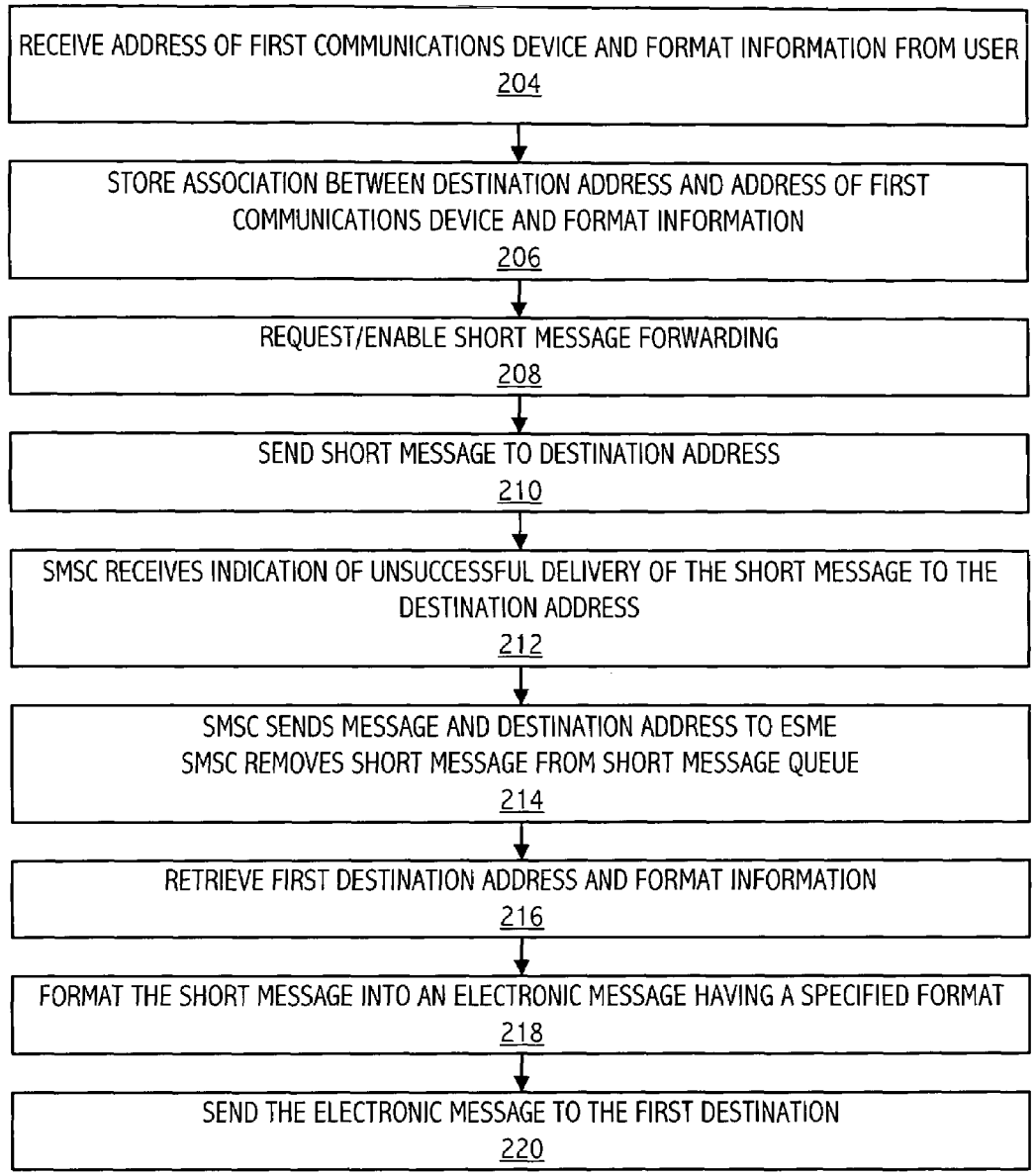
FIG. 2 depicts information and control flows for a technique in accordance with one or more embodiments of the present invention.

FIG. 2 illustrates a technique for forwarding short messages to alternate devices when a destination communications device is unavailable. A user provides application 120 with at least one alternate destination address for receiving messages (204). This information is stored in data storage 118 (206). Data storage 118 contains one or more entries corresponding to a respective short message entity registered for a short message forwarding service. Data entries generally include a value representing a mobile destination address and an address corresponding to an alternate communications device. In an exemplary embodiment, a user profile contains multiple sub-entries. The sub-entries may include, but are not limited to associations for multiple destination addresses, formatting information, and multiple requesting communications devices. A short message forwarding request received from any one of the communications devices identified in a user profile may effectuate short message forwarding to the communications device that generated the forwarding request, or to an alternate communications device having a corresponding address stored in a data entry.

In addition, data entries of data storage 118 may include formatting information. The format may be pre-programmed, or may be selected by the user. If selected by the user, this selection may be performed via a customer interface on the Internet or on a communications device. Alternatively, the selection may be made at the time of generating the short message forwarding request. Formats may include, but are not limited to, converting the short message into a voice mail message via text-to-speech technology, converting the short message into an image file and displaying the image on the display of a communications device.

In an exemplary system, the user enables short message forwarding (208) by communicating a short message forwarding request to application 120 via communications device 102. In an exemplary system, the request is initiated by a star code entered into a keypad of communications device 102. Alternatively, a dedicated button on the body of communications device 102, a selection of a menu item presented on a user interface of communications device 102, or a voice-command uttered into a microphone coupled to the communications device 102 may signal a short message forwarding command. Alternatively, the user may communicate the request to ESME 116 from web server 126. In some realizations of the present invention, application 120 stores in data storage 118 an indication that forwarding is enabled for a particular short message entity.

A short message is sent to destination communications device 102 that is unable to receive a short message (210). A message center (e.g., SMSC 110) that supports the portion of the network that includes destination communications device 102 receives the message. When the message fails, as indicated by a lack of an acknowledge message or an error message sent from the destination communications device 102 to the message center, instead of placing the short message in a queue for transmission at a later time, the message center sends the message with the address of the destination communications device (e.g, phone number) to ESME 116 (214).

Application 120 on ESME 116 retrieves an entry in data storage 118 that corresponds to the destination communications device. Application 120 formats the short message into an electronic message according to the user profile (218), and transmits the message (220) to an alternate communications device. The electronic message may be transmitted in a new format (e.g., as a voice mail message or as an image file) to the destination communications device or the message may be transmitted to an alternate communications device, i.e., ESME 116 may communicate the electronic message through network 114 to another ESME, e.g., paging bureau 106 or email system 122. Alternatively, instead of sending a short message to an alternative communications device, the short message may be converted into an electronic message having a format compliant with a destination device that is not short message compliant. The electronic message may then be sent to the original destination device.

The operations referred to herein may be embodied as computer program product executables encoded in one or more computer readable media selected from the set of disk, tape, or other magnetic, optical, or electronic storage medium. The description of the invention set forth herein is illustrative, and is not intended to limit the scope of the invention as set forth in the following claims. For example, while the invention has been described in an embodiment that includes one SMSC, one of skill in the art will appreciate that the teachings herein can be utilized with multiple SMSCs that support different portions of the mobile network. Variations and modifications of the embodiments disclosed herein, may be made based on the description set forth herein, without departing from the scope and spirit of the invention as set forth in the following claims.

The invention claimed is:

1. A method for communicating short messages comprising:
   forwarding an electronic message to a first communications device, the forwarding being in response to at least an indication of unsuccessful delivery of a short message service (SMS) message to a destination communications device,
   wherein the first communications device is incompatible with SMS.

2. The method, as recited in claim 1, wherein the forwarding is enabled from the destination communications device.

3. The method, as recited in claim 1, wherein the forwarding is enabled from the first communications device.

4. The method, as recited in claim 1, wherein the forwarding is enabled from a web browser.

5. The method, as recited in claim 4, further comprising: removing the SMS message from a short message queue.

6. The method, as recited in claim 1, wherein the electronic message is based at least in part on the SMS message.

7. The method, as recited in claim 6, further comprising:
   formatting the electronic message as a message having a format compatible with the first communications device.

8. The method, as recited in claim 7, wherein the first communications device is the destination communications device.

9. The method, as recited in claim 1, further comprising: removing the SMS message from a short message queue.

10. The method, as recited in claim 1, further comprising:
    associating the first communications device with the destination communications device.

11. The method, as recited in claim 1, further comprising:
    receiving the SMS message; and
    attempting to send the SMS message to the destination communications device.

12. The method, as recited in claim 1, further comprising:
    formatting the electronic message compatible with the first communications device.

13. A system for communicating short messages comprising:
    a short message service (SMS) management facility that communicates an electronic message to a first communications device in response to an indicator of an unsuccessful delivery of the short message to a destination communications device,
    wherein the first communications device is incompatible with SMS.

14. The system, as recited in claim 13, further comprising:
    a destination communications device for receiving at least one short message from the SMS management facility.

15. The system, as recited in claim 13, further comprising:
    a first communications device for receiving at least one electronic message from the SMS management facility.

16. The system, as recited in claim 13, further comprising:
    a first store including at least one entry corresponding to the destination communications device.

17. The system, as recited in claim 16, wherein the entry includes an association to the first communications device.

18. The system, as recited in claim 16, wherein at least a portion of the first store resides on a first server.

19. The system, as recited in claim 16, wherein at least a portion of the SMS management facility resides on a short message service center (SMSC).

20. The system, as recited in claim 16, wherein at least a portion of the SMS management facility resides on a first server.

21. The system, as recited in claim 13, wherein the electronic message is based at least in part on a short message and a destination address associated with the short message.

22. The system, as recited in claim 21, wherein the entry includes information for formatting the electronic message.

23. An apparatus for communicating short messages comprising:
    means for forwarding an electronic message to a first communications device, the forwarding being in response to at least an indicator of unsuccessful delivery of a short message service (SMS) message to a destination communications device;
    means for formatting the electronic message as a message having a format compatible with the first communications device; and
    means for enabling the means for forwarding.

24. The apparatus, as recited in claim 23, wherein the first communications device is incompatible with SMS.

* * * * *